US012602897B2

(12) United States Patent
Ge et al.

(10) Patent No.: US 12,602,897 B2
(45) Date of Patent: Apr. 14, 2026

(54) FACE DETECTION BASED FILTERING FOR IMAGE PROCESSING

(71) Applicant: QUALCOMM Incorporated, San Diego, CA (US)

(72) Inventors: Peiguang Ge, Shanghai (CN); Changsheng Guo, Shanghai (CN); Zhiqiang Jin, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/550,435

(22) PCT Filed: May 21, 2021

(86) PCT No.: PCT/CN2021/095136
    § 371 (c)(1),
    (2) Date: Sep. 13, 2023

(87) PCT Pub. No.: WO2022/241758
    PCT Pub. Date: Nov. 24, 2022

(65) Prior Publication Data
    US 2024/0153231 A1     May 9, 2024

(51) Int. Cl.
    *G06V 10/25*        (2022.01)
    *G06T 5/20*         (2006.01)
    (Continued)

(52) U.S. Cl.
    CPC ................ *G06V 10/25* (2022.01); *G06T 5/20* (2013.01); *G06T 5/50* (2013.01); *G06V 10/761* (2022.01);
    (Continued)

(58) Field of Classification Search
    CPC .... G06V 10/25; G06V 10/761; G06V 40/161; G06T 5/20; G06T 5/50;
    (Continued)

(56) References Cited

U.S. PATENT DOCUMENTS 8,731,282 B1     5/2014   Schink
9,830,503 B1 *  11/2017   Martin ................... G06V 20/52
                (Continued)

FOREIGN PATENT DOCUMENTS

CN        104769639 A      7/2015
CN        111967462 A     11/2020
                (Continued)

OTHER PUBLICATIONS

Supplementary European Search Report—EP21940211—Search Authority—Munich—Dec. 19, 2024 (11 pp).
                (Continued)

*Primary Examiner* — Mekonen T Bekele
(74) *Attorney, Agent, or Firm* — Shumaker & Sieffert, PA/QUALCOMM Incorporated

(57)                ABSTRACT

An example device for image processing includes a memory and one or more processors coupled to the memory and configured to determine a region of interest (ROI) within a first frame and a second frame of a plurality of frames, apply a first amount of filtering on the ROI of the first frame and the second frame to generate a filtered ROI, apply a second
(Continued)

DETERMINE ROI WITHIN FIRST FRAME AND SECOND FRAME OF PLURALITY OF FRAMES — 80

APPLY FIRST AMOUNT OF FILTERING ON ROI OF FIRST FRAME AND SECOND FRAME TO GENERATE FILTERED ROI — 82

APPLY SECOND AMOUNT OF FILTERING ON REMAINING REGION OF FIRST FRAME AND SECOND FRAME TO GENERATE FILTERED REMAINING REGION — 84

COMBINE FILTERED ROI AND FILTERED REMAINING REGION TO GENERATE FILTERED FRAME — 86

OUTPUT FILTERED FRAME — 88 amount of filtering on a remaining region of the first frame and the second frame to generate a filtered remaining region, combine the filtered ROI and the filtered remaining region to generate a filtered frame, and output the filtered frame.

24 Claims, 5 Drawing Sheets

(51) Int. Cl.
 G06T 5/50 (2006.01)
 G06V 10/74 (2022.01)
 G06V 40/16 (2022.01)

(52) U.S. Cl.
 CPC .. G06V 40/161 (2022.01); *G06T 2207/20221* (2013.01); *G06T 2207/30201* (2013.01)

(58) Field of Classification Search
 CPC . G06T 2207/20221; G06T 2207/30201; G06T 5/70; G06T 2207/10016
 See application file for complete search history.

(56) References Cited

U.S. PATENT DOCUMENTS

| | | | | |
|---|---|---|---|---|
| 2006/0215766 A1* | 9/2006 | Wang | ................... | H04N 19/126 |
| | | | | 375/E7.172 |
| 2007/0139517 A1* | 6/2007 | Jenkins | .................. | H04N 7/141 |
| | | | | 348/E7.078 |
| 2015/0139394 A1* | 5/2015 | Kang | ..................... | A61B 6/542 |
| | | | | 378/62 |
| 2016/0125618 A1 | 5/2016 | Johansson et al. | | |

FOREIGN PATENT DOCUMENTS

| | | |
|---|---|---|
| KR | 20120019662 A | 3/2012 |
| WO | 2014074601 A2 | 5/2014 |

OTHER PUBLICATIONS

International Search Report and Written Opinion—PCT/CN2021/095136—ISA/EPO—Feb. 15, 2022 (9 pp).

* cited by examiner

REGION INFORMATION    PLURALITY OF FRAMES

ANCHOR FRAME SELECTION
CIRCUIT
36

TEMPORAL FILTER CIRCUIT
38

POST-PROCESSING CIRCUIT
40

CAMERA PROCESSOR
14

OUTPUT FRAME

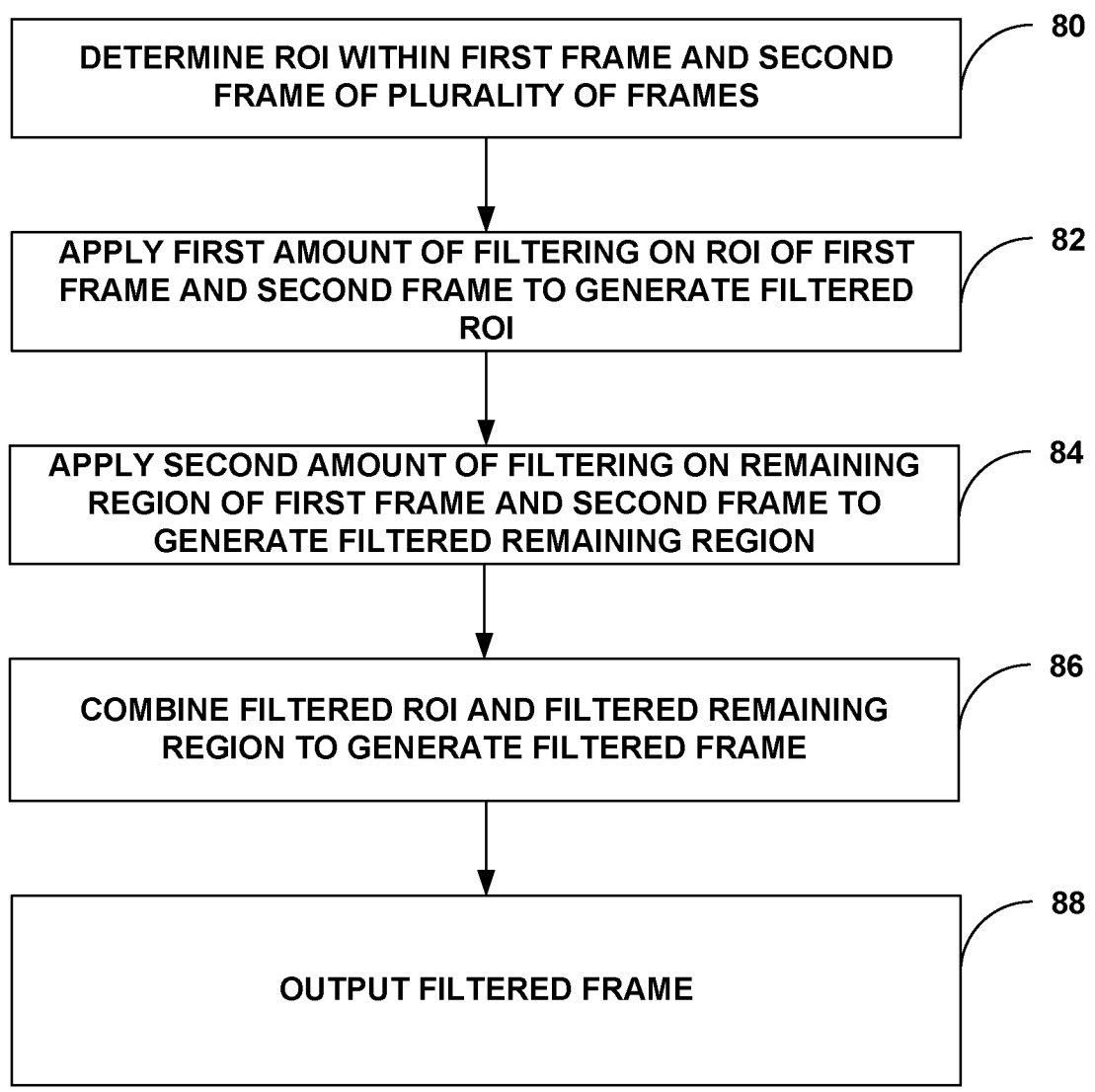

DETERMINE ROI WITHIN FIRST FRAME AND SECOND
FRAME OF PLURALITY OF FRAMES          80

APPLY FIRST AMOUNT OF FILTERING ON ROI OF FIRST
FRAME AND SECOND FRAME TO GENERATE FILTERED
ROI          82

APPLY SECOND AMOUNT OF FILTERING ON REMAINING
REGION OF FIRST FRAME AND SECOND FRAME TO
GENERATE FILTERED REMAINING REGION          84

COMBINE FILTERED ROI AND FILTERED REMAINING
REGION TO GENERATE FILTERED FRAME          86

OUTPUT FILTERED FRAME          88

FIG. 5

FACE DETECTION BASED FILTERING FOR IMAGE PROCESSING

This application is a national stage application under 35 U.S.C. § 371 of PCT Application No. PCT/CN2021/095136, filed May 21, 2021. The entire content of PCT Application No. PCT/CN2021/095136 is incorporated herein by reference as if fully set forth below in its entirety and for all applicable purposes.

TECHNICAL FIELD

The disclosure relates to blending frames for image processing.

BACKGROUND

A computing device includes one or more cameras that capture frames (e.g., images). Examples of the computing device include stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any device with digital imaging or video capabilities.

The computing device processes the captured frames and outputs the frames for display. In some examples, the computing device captures a plurality of frames and filters the frames together to form an output frame that is output for display.

SUMMARY

In general, this disclosure describes example techniques to selectively apply different amounts of filtering for regions of interest (ROIs) between frames and remaining regions within frames. For instance, to generate a frame having low noise, a computing device captures a plurality of frames and performs filtering (e.g., such as blending) across the frames to reduce noise. While the noise reduction is beneficial, one possible consequence is blurring of ROIs, such as faces in the frames.

In one or more examples, a filter circuit may receive information indicative of ROI within the frames. The filter circuit may apply a first amount of filtering on the ROI within the frames (e.g., weaker filtering), and a second amount of filtering on the remaining region within the frames (e.g., stronger filtering). The first amount of filtering may be less than the second amount of filtering. In this manner, the example techniques may provide for a way in which to reduce noise, while preserving detail and avoiding blurring in ROIs.

In one example, this disclosure describes a device for image processing includes a memory and one or more processors coupled to the memory and configured to determine a region of interest (ROI) within a first frame and a second frame of a plurality of frames, apply a first amount of filtering on the ROI of the first frame and the second frame to generate a filtered ROI, apply a second amount of filtering on a remaining region of the first frame and the second frame to generate a filtered remaining region, combine the filtered ROI and the filtered remaining region to generate a filtered frame, and output the filtered frame.

In another example, this disclosure describes a method for image processing includes determining a region of interest (ROI) within a first frame and a second frame of a plurality of frames, applying a first amount of filtering on the ROI of the first frame and the second frame to generate a filtered ROI, applying a second amount of filtering on a remaining region of the first frame and the second frame to generate a filtered remaining region, combining the filtered ROI and the filtered remaining region to generate a filtered frame, and outputting the filtered frame.

In another example, this disclosure describes a computer-readable storage medium storing instructions thereon that when executed cause one or more processors to: determine a region of interest (ROI) within a first frame and a second frame of a plurality of frames, apply a first amount of filtering on the ROI of the first frame and the second frame to generate a filtered ROI, apply a second amount of filtering on a remaining region of the first frame and the second frame to generate a filtered remaining region, combine the filtered ROI and the filtered remaining region to generate a filtered frame, and output the filtered frame.

In another example, this disclosure describes a device for image processing includes means for determining a region of interest (ROI) within a first frame and a second frame of a plurality of frames, means for applying a first amount of filtering on the ROI of the first frame and the second frame to generate a filtered ROI, means for applying a second amount of filtering on a remaining region of the first frame and the second frame to generate a filtered remaining region, means for combining the filtered ROI and the filtered remaining region to generate a filtered frame, and means for outputting the filtered frame.

This summary is intended to provide an overview of the subject matter described in this disclosure. It is not intended to provide an exclusive or exhaustive explanation of the systems, device, and methods described in detail within the accompanying drawings and description herein. Further details of one or more examples of the disclosed technology are set forth in the accompanying drawings and in the description below. Other features, objects, and advantages of the disclosed technology will be apparent from the description, drawings, and claims.

BRIEF DESCRIPTION OF DRAWINGS

FIG. 5 is a flowchart illustrating an example operation in accordance with example techniques of this disclosure.

Like reference characters denote like elements throughout the description and figures.

DETAILED DESCRIPTION

Figure 1:
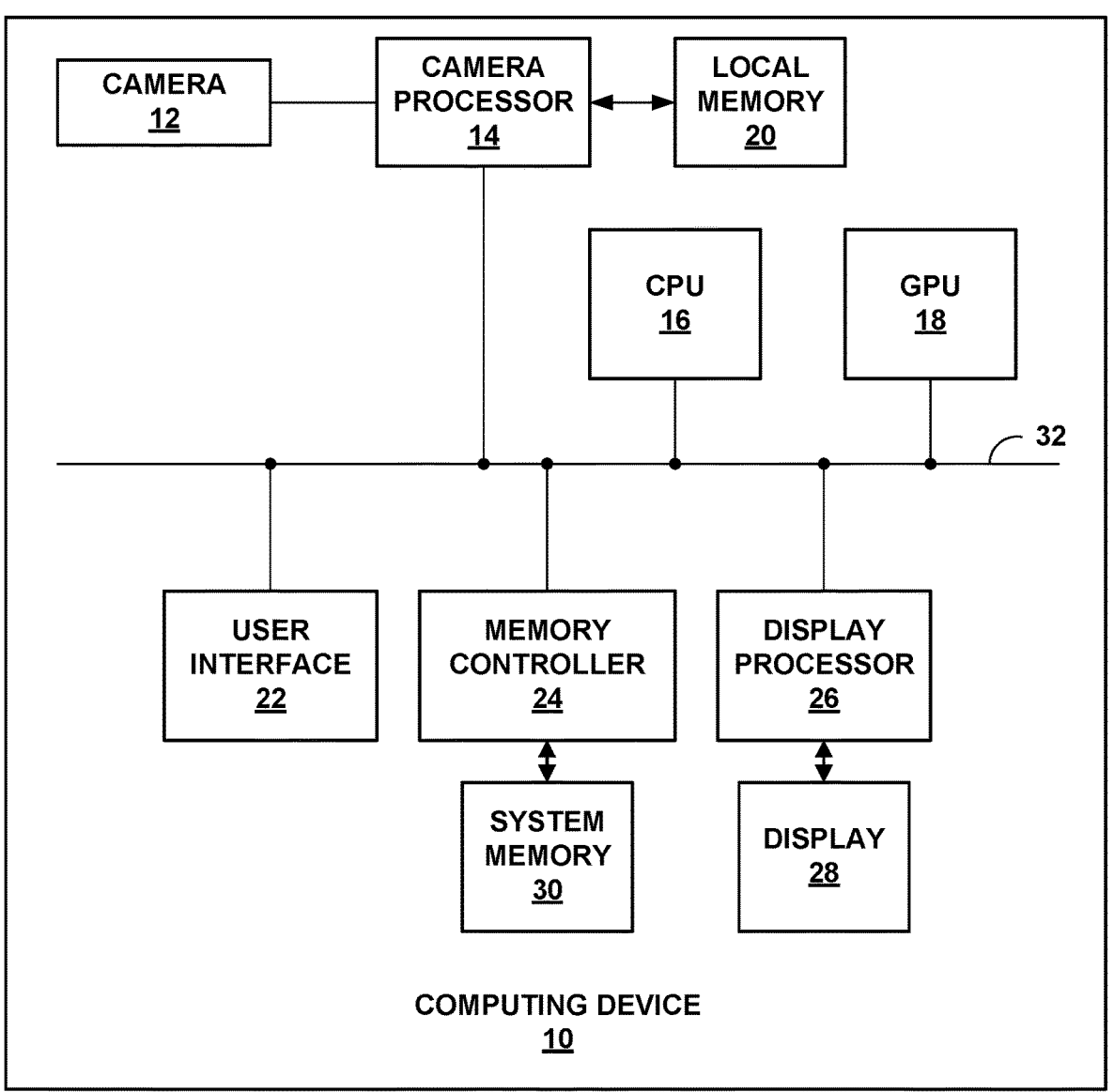
FIG. 1 is a block diagram of a device configured to perform one or more of the example techniques described in this disclosure.

The example techniques described in this disclosure relate to selectively applying different amounts of filtering on regions of interest and remaining regions of frames. In one or more examples, the filtering refers to filtering across frames (e.g., temporal filtering). For instance, each frame may include an ROI and a remaining region, and the example techniques describe ways in which to apply different filtering to the ROI of the frames and the remaining region of the frames.

A computing device may be configured to capture a plurality of frames (e.g., images) that the computing device filters together to form a filtered frame. Rather than displaying each of the plurality of frames, a display may output the resulting filtered frame. Filtering of one or more of the plurality of frames may be beneficial because the filtering may be a form of blending that reduces noise. One example technique of filtering of one or more of the plurality of frames includes a multi-frame noise reduction (MFNR) technique. In the MFNR technique, the computing device may determine an anchor frame from the plurality of frames, which may be the first frame of the plurality of frames or computing device may utilize other techniques to determine the anchor frame. The computing device may filter (e.g., by blending) the anchor frame with another frame of the plurality of frames to generate a first intermediate filtered frame. The computing device may then filter the first intermediate filtered frame with another frame of the plurality of frames to generate a second intermediate filtered frame, and so forth until the last frame of the plurality of frames. The result of the filtering may be the filtered frame.

The filtered frame tends to have less noise, but there may be over filtering, resulting in blurriness, in certain regions. If the blurriness occurs in a region of interest (ROI), such as faces, the quality of the filtered frame may be reduced.

This disclosure describes example techniques of filtering frames in a way that reduces noise but preserves detail in ROIs. As one example, the computing device may apply a first amount of filtering to the ROI within the frames (e.g., within a first frame and a second frame), and apply a second amount of filtering to the remaining region within the frames (e.g., within the first frame and the second frame). The first amount of filtering may be less than the second amount of filtering. Therefore, less filtering is applied to the ROI of the frames, and more filtering is applied to the remaining region of the frames. Stated another way, weaker filtering is applied to the ROI of the frames, and stronger filtering is applied to the remaining region of the frames.

The amount of filtering applied may refer to a number of frames that are utilized for filtering. The more frames that are used for filtering may mean the stronger the filtering. For example, as part of performing the filtering, the computing device may compare a first frame (e.g., anchor frame) to a second frame. The computing device may determine a difference value (e.g., normalized square of absolute difference (SAD)) between the first frame and the second frame, and compare the difference value to a threshold value. If the difference value is less than the threshold value, then the computing device may blend the first frame and the second frame to generate a first intermediate frame. If the difference value is greater than the threshold value, then the computing device may not blend the first frame and the second frame, and the first frame may be the first intermediate frame. The computing device may then compare the first intermediate frame with a third frame, and selectively blend or not blend to generate a second intermediate frame and so forth.

In one or more examples, the computing device may utilize a first threshold for the ROI of the frames and a second threshold for the remaining region of the frames. The first threshold may be less than the second threshold. For example, for an ROI in the first frame and the second frame, the computing device may determine a first difference value and compare the first difference value to the first threshold. If the first difference value is less than the first threshold, then the computing device may blend the ROI in the first frame and the ROI in the second frame. If the first difference value is greater than the first threshold, then the computing device may not blend the ROI in the first frame and the ROI in the second frame.

For a remaining region in the first frame and the second frame, the computing device may determine a second difference value and compare the second difference value to the second threshold. If the second difference value is less than the second threshold, then the computing device may blend the remaining region in the first frame and the remaining region in the second frame. If the second difference value is greater than the second threshold, then the computing device may not blend the remaining region in the first frame and the remaining region in the second frame.

Because the second threshold is greater than the first threshold, there is a higher likelihood that the second difference value will be less than the second threshold than the first difference value will be less than the first threshold. Therefore, there is a higher likelihood that remaining region of the first frame and the second frame will be blended than the ROI of the first frame and the second frame being blended. Accordingly, there is a higher likelihood that more frames will be selected for blending the remaining region, resulting in stronger filtering, than frames that will be selected for blending the ROI, resulting in weaker filtering.

The above describes comparing difference values between frames to different thresholds to determine whether to perform filtering. However, the techniques are not so limited. In general, techniques in which stronger filtering (e.g., more frames are used for filtering) is applied to remaining regions and weaker filtering (e.g., fewer frames are used for filtering) is applied to ROIs may be utilized. Also, blending is described as an example of filtering, but other types of filtering may be used. In blending, the computing device may determine an average (e.g., including weighted average) of sample values in the frames to generate filtered values.

FIG. 1 is a block diagram of a device configured to perform one or more of the example techniques described in this disclosure. Examples of computing device 10 include stand-alone digital cameras or digital video camcorders, camera-equipped wireless communication device handsets, such as a mobile device having one or more cameras, laptops, desktops, cellular or satellite radio telephones, camera-equipped personal digital assistants (PDAs), panels or tablets, gaming devices, computer devices that include cameras, such as so-called "web-cams," or any device with digital imaging or video capabilities.

As illustrated in the example of FIG. 1, computing device 10 includes camera 12 (e.g., having an image sensor and lens), camera processor 14 and local memory 20 of camera processor 14, a central processing unit (CPU) 16, a graphical processing unit (GPU) 18, user interface 22, memory controller 24 that provides access to system memory 30, and display processor 26 that outputs signals that cause graphical data to be displayed on display 28. Although the example of FIG. 1 illustrates computing device 10 including one camera 12, in some examples, computing device 10 may include a plurality of cameras, such as for omnidirectional image or video capture. Also, although the example of FIG. 1 illustrates one camera processor, in some examples, computing device 10 may include a plurality of camera processors (e.g., one camera processor for each camera, or two or more camera processors for each camera).

Also, although the various components are illustrated as separate components, in some examples the components may be combined to form a system on chip (SoC). As an example, camera processor 14, CPU 16, GPU 18, and display processor 26 may be formed on a common integrated circuit (IC) chip. In some examples, one or more of camera processor 14, CPU 16, GPU 18, and display processor 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 and system memory 30 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a Hyper-Transport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of computing devices and/or other image processing systems with the same or different components may be used to implement the techniques of this disclosure.

Camera processor 14 is configured to receive image frames from camera 12, and process the image frames to generate output frames for display. CPU 16, GPU 18, camera processor 14, or some other circuitry may be configured to process the output frame that includes image content generated by camera processor 14 into images for display on display 28. In some examples, GPU 18 may be further configured to render graphics content on display 28.

In some examples, camera processor 14 may be configured as an image processing pipeline. For instance, camera processor 14 may include a camera interface that interfaces between camera 12 and camera processor 14. Camera processor 14 may include additional circuitry to process the image content.

Camera processor 14 outputs the resulting frames with image content (e.g., pixel values for each of the image pixels) to system memory 30 via memory controller 24. In one or more examples described in this disclosure, the frames may be further processed for generating one or more frames for display. For example, as described in more detail, camera processor 14 may be configured to filter one or more frames together to form a filtered frame that is output for display. In one or more examples, camera processor 14 may be configured to apply different amounts of filtering on different regions of frames to generate the filtered frame. In some examples, rather than camera processor 14 performing the filtering, GPU 18 or some other circuitry of computing device 10 may be configured to perform the filtering.

The amount of filtering that is applied may refer to the number of frames that contribute to the filtering, where the more frames that contribute to the filtering, the higher the amount of filtering is applied, and the fewer frames that contribute to the filtering, the lower the amount of filtering is applied. However, there may be different ways in which to apply different amounts of filtering, and the example techniques should not be considered limited to using different number of frames to control the amount of filtering that is performed.

This disclosure describes the examples techniques as being performed by camera processor 14. However, the example techniques should not be considered limited to camera processor 14 performing the example techniques. For instance, camera processor 14 in combination with CPU 16, GPU 18, and/or display processor 26 may be configured to perform the example techniques described in this disclosure. For example, one or more processors may be configured to perform the example techniques described in this disclosure. Examples of the one or more processors include camera processor 14, CPU 16, GPU 18, display processor 26, or any combination of one or more of camera processor 14, CPU 16, GPU 18, and display processor 26.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is a camera application. CPU 16 executes the camera application, and in response, the camera application causes CPU 16 to generate content that display 28 outputs. GPU 18 may be configured to process the content generated by CPU 16 for rendering on display 28. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). As one example, the user of computing device 10 may select to take multiple frames (e.g., multiple pictures), where two or more of the multiple frames are filtered together (e.g., blended to reduce blur) to generate one or more output frames. However, taking multiple frames that are filtered together may be the default option (e.g., no user selection is needed). The camera application also causes CPU 16 to instruct camera processor 14 to capture and process the frames of image content captured by camera 12 in the user-defined manner.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting frames from camera processor 14, etc. System memory 30 may additionally store information for use by and/or generated by other components of computing device 10. For example, system memory 30 may act as a device memory for camera processor 14.

As one example, camera processor 14 may cause camera 12 to capture a plurality of frames (e.g., a plurality of pictures). The number of frames in the plurality of frames may be approximately 4 to 8 frames, but the techniques described in this disclosure are not limited to any particular number of frames. Camera 12 may capture the plurality of frames sequentially. Therefore, there may be a slight delay between when the first frame of the plurality of frames is captured and the last frame of the plurality of frames is captured. In some examples, the delay between when the first frame and the last frame is captured may be in the order of milliseconds (e.g., 300 milliseconds).

Camera processor 14 may perform some initial image processing on the plurality of frames, but such initial image processing is not necessary in all examples. Camera processor 14 may output the plurality of frames to system memory 30 for storage. In some examples, rather than or in addition to, outputting the plurality of frames to system memory 30, camera processor 14 may output the plurality of frames to local memory 20. As another example, camera processor 14 may store each of the plurality of frames, as each frame is captured, into local memory 20 for temporary storage and then move the plurality of frames from local memory 20 to system memory 30. In some examples, camera 12 may bypass camera processor 14 and directly store the captured frames in system memory 30.

In accordance with one or more examples described in this disclosure, camera processor 14 may access the plurality of frames from local memory 20 and/or system memory 30 for filtering two or more, or all, of the plurality of frames to generate a filtered frame that is output for display. For example, camera processor 14 may be configured to perform operations of a multi-frame noise reduction (MFNR) technique. The MFNR technique may include filtering the plurality of frames (e.g., approximately 4 to 8 frames) to blend together the plurality of frames to generate one or more filtered frames, including, in some cases, only one filtered frame. Such filtering may reduce noise but keep image details, for example, by blending stationary regions in the frames more than moving regions in the frame, to generate an output frame with reduced ghosting and higher image quality. In some examples, image alignment may be performed before filtering to avoid handheld shaking blur (e.g., blur due to inadvertent movement of computing device 10 by the user).

In the MFNR techniques, camera processor 14 may select an anchor frame from the plurality of frames. The anchor frame may be the first frame of the plurality of frames, but any of the frames may be the anchor frame. In some examples, camera processor 14 may select an anchor frame based on characteristics of the frames (e.g., frame having highest sharpness).

Camera processor 14 may select the anchor frame and, in some examples, reorder the plurality of frames, with the anchor frame as the first frame. Camera processor 14 may blend the anchor frame and at least another frame of the plurality of frames. The result of the blending may be a first intermediate frame. Camera processor 14 may blend the first intermediate frame with another frame of the plurality of frames to generate a second intermediate frame, and so on, until camera processor 14 blends the last frame to generate the filtered frame.

By blending the plurality of frames starting with the anchor frame, camera processor 14 may generate a filtered frame having a lesser amount of motion blur. That is, the MFNR techniques may increase the signal-to-noise ratio in the resulting filtered frame.

Blending is one example of filtering between frames. In blending, camera processor 14 may determine an average of sample values of corresponding (e.g., co-located) samples in two frames, and set the result of the average as the sample value for an intermediate frame or filtered frame. In some examples, camera processor 14 may apply a weighted average. There may be other ways in which to perform filtering, and blending is one example way to perform filtering.

Also, the filtering performed between frames may be referred to as temporal filtering. For instance, because the plurality of frames are captured at slightly different times (e.g., within milliseconds), filtering of the frames may be considered as filtering over time, and therefore, "temporal filtering."

Filtering of such plurality of frames (e.g., frames captured within milliseconds) to generate a filtered frame for display may improve image quality (e.g., increased signal to noise ratio). However, such filtering may introduce blurring, and possibly excessive blurring, in certain regions of interest (ROIs). As one example, the ROI may be a face captured in the frames, but other examples of ROIs are possible.

This disclosure describes example techniques to apply a first amount of filtering on ROIs of the frames, and a second, different amount of filtering on other portions of the frames. For example, the example techniques may apply a first amount of filtering on the ROI of a first frame and a second frame of the plurality of frames as part of the process to generate a filtered ROI, and apply a second amount of filtering on a remaining region of the first frame and the second frame as part of the process to generate a filtered remaining region. The amount of filtering that is applied may refer to the number of frames that are used for filtering. For instance, prior to filtering, camera processor 14 may determine whether a particular frame should contribute to the filtering.

As one example, camera processor 14 may compare samples in a first frame and a second frame (e.g., anchor frame and another frame or intermediate frame and another frame). For example, camera processor 14 may determine a normalized sum of absolute differences (SAD). Camera processor 14 may determine a difference in the sample values of corresponding samples, sum the result, and divide by number of samples to normalize the result. Camera processor 14 may compare the result of the normalized SAD to a threshold. If the result of the normalized SAD is less than the threshold, then camera processor 14 may utilize the second frame for filtering. If the result of the normalized SAD is greater than the threshold, then camera processor 14 may not utilize the second frame for filtering.

Using normalized SAD to determine whether to utilize a frame for filtering is one example. The techniques should not be considered limited to using normalized SAD, and other techniques to compare frames to determine if a frame should be used for filtering are possible. For ease of description, the example techniques are described with respect to comparing a value (e.g., normalized SAD value) to a threshold to determine whether to use a frame for filtering, but the techniques are not limited to such examples. For instance, techniques like utilizing average values, template comparisons, sum of squared differences, root-mean square, and other such techniques to determine a value for comparison with a threshold are possible. Also, comparing a value to a threshold to determine if a frame is to be used for filtering is one example, and there may be other ways in which to determine if a frame should be used for filtering without necessarily relying on a comparison to a threshold.

The value of the threshold may be a factor in whether a frame is used for filtering or not. For instance, if the threshold is set to a relatively low value, then there is less likelihood that the SAD value will be less than the threshold, as compared to if the threshold is set to a relatively high value. As an example, if the threshold is set to 10, then any SAD value less than 10 would be less than the threshold, but if threshold is set to 5, then only SAD values less than 5 would be less than threshold.

Accordingly, if the threshold is set relatively low, then there would be fewer frames that would be involved in the filtering, as compared to the threshold being set relatively high. For instance, if the threshold were set to 10, then frames having a SAD value less than 10 would be involved in the filtering (e.g., the sample values of the samples in the frames would be blended). However, if the threshold were set to 5, the frames having a SAD value less than 5 would be involved in the filtering, which may be fewer frames than if the threshold were 10.

In one or more examples, to control the amount of filtering that is applied to the ROI within the frames and the remaining regions of the frame (e.g., regions other than ROI), camera processor 14 may select different numbers of frames to use for filtering the ROI of the frames and the remaining region of the frames. One example way in which camera processor 14 may select different number of frames may be based on having different thresholds for the ROI and the remaining region.

To avoid over blurring, there may be benefits in having less filtering (also called weaker filtering) in the ROI, but to keep high signal to noise ratio, there may be benefits in having more filtering (also called stronger filtering) in the remaining region of the frame (e.g., the portion of the frame not containing the ROI). This disclosure describes example techniques where the ROI of the frames are filtered to generate a filtered ROI, and where the remaining region of the frames are filtered to generate a filtered remaining region. The filtered ROI and the filtered remaining region are then combined to generate the filtered frame.

The amount of filtering that is applied to the ROI and to the remaining region may be different (e.g., less filtering for ROI and more filtering for remaining region). In one or more examples, the ROI of fewer frames may be filtered to generate the filtered ROI, as compared to frames that are filtered to generate the filtered remaining region. In this way, camera processor 14 may apply weaker filtering for the ROI and stronger filtering for the remaining region.

For example, one or more processors (e.g., camera processor 14, CPU 16, GPU 18, or display processor 26) may determine an ROI within each frame of a plurality of frames (e.g., determine an ROI within a first frame and a second frame of a plurality of frames). The plurality of frames may be the frames that camera 12 captures within milliseconds of the same image content that are be filtered to generate a filtered image. For instance, the plurality of frames are captured with camera 12 within less than 300 milliseconds and capture substantially same image content (e.g., more than 90% of the image content is the same).

The one or more processors may apply a first amount of filtering on the ROI for one or more frames of the plurality of frames to generate a filtered ROI, and apply a second amount of filtering on a remaining region for the one or more frames of the plurality of frames to generate a filtered remaining region. The one or more processors may combine the filtered ROI and the filtered remaining region to generate a filtered frame, and output the filtered frame.

As an example, the one or more processors may apply a first amount of filtering on the ROI of the first frame and the second frame to generate a filtered ROI. In this example, applying the first amount filtering on the ROI of the first frame and the second frame may be part of the process of generating the filtered ROI. For instance, filtering on the ROI of the first frame and the second frame may generate an intermediate filtered ROI prior to generating the filtered ROI. The intermediate filtered ROI may then be filtered with an ROI of a third frame, and so on to ultimately generate the filtered ROI.

The one or more processors may apply a second amount of filtering on the remaining region of the first frame and the second frame to generate a filtered remaining region. In this example, applying the second amount filtering on the remaining region of the first frame and the second frame may be part of the process of generating the filtered remaining region. For instance, filtering on the remaining region of the first frame and the second frame may generate an intermediate filtered remaining region prior to generating the filtered remaining region. The intermediate filtered remaining region may then be filtered with a remaining region of a third frame, and so on to ultimately generate the filtered remaining region.

In one or more examples, applying the first amount of filtering may include performing filtering of the ROI in a first group of frames of the plurality of frames, and applying the second amount of filtering may include performing filtering of the remaining region in a second group of frames of the plurality of frames. In such examples, a number of frames in the first group of frames is less than a number of frames in the second group of frames. For example, applying the first amount of filtering on the ROI may include determining whether an ROI in a frame of the plurality of frames is to be included in the filtering based on a first threshold, and applying the second amount of filtering on the remaining region may include determining whether a remaining region in the frame of the plurality of frames is to be included in the filtering based on a second threshold. The first threshold and the second threshold may be different (e.g., the first threshold is less than the second threshold).

As an example, to apply the first amount of filtering on the ROI, the one or more processors (e.g., camera processor 14, CPU 16, GPU 18, display processor 26, or any combination) may determine a first difference value between the ROI in a first frame (e.g., anchor frame) of the plurality of frames and the ROI in a second frame of the plurality of frames, compare the first difference value to a first threshold, and blend the ROI in the first frame with the ROI in the second frame based on the comparison of the first difference value to the first threshold to generate an intermediate filtered ROI. To apply the second amount of filtering on the remaining region, the one or more processors may determine a second difference value between the remaining region in the first frame of the plurality of frames and the remaining region in the second frame of the plurality of frames, compare the second difference value to a second threshold, and blend the remaining region in the first frame with the remaining region in the second frame based on the comparison of the second difference value to the second threshold to generate an intermediate filtered remaining region. The second threshold may be different than the first threshold.

In the above example, to blend the ROI in the first frame with the ROI in the second frame based on the comparison of the first difference value to the first threshold, the one or more processors may determine that the first difference value is less than the first threshold, and blend the ROI in the first frame with the ROI in the second frame based on the first difference value being less than the first threshold. To blend the remaining region in the first frame with the remaining region in the second frame based on the comparison of the second difference value to the second threshold, the one or more processors may determine that the second difference value is less than the second threshold, and blend the remaining region in the first frame with the remaining region in the second frame based on the second difference value being less than the second threshold.

The above example described an example way in which the intermediate filtered ROI and intermediate filtered remaining region are generated. The one or more processors may then determine a third difference value between the intermediate filtered ROI and the ROI in a third frame of the plurality of frames, compare the third difference value to the first threshold, and blend the intermediate filtered ROI with the ROI in the third frame based on the comparison of the third difference value to the first threshold. The one or more processors may determine a fourth difference value between the intermediate filtered remaining region and the remaining region in the third frame of the plurality of frames, compare the fourth difference value to the second threshold, and blend the intermediate filtered remaining region with the remaining region in the third frame based on the comparison of the fourth difference value to the second threshold.

The one or more processors may repeat these example operations for the remaining frames to generate the filtered ROI and filtered remaining region. The one or more processors may then combine the filtered ROI and the filtered remaining region to generate the filtered frame.

There may be various examples of the ROI. As one example, the ROI may be a user selected ROI (e.g., the user may select the ROI as part of the executing the camera application). As another example, the ROI may be one or more objects that are moving. As another example, the ROI may be a face of a person (e.g., CPU 16 may execute a face detection algorithm that detects faces within frames captured by camera 12).

In one or more examples, the one or more processors may include fixed-function circuitry configured to perform the above example techniques. However, the one or more processors may include programmable circuitry or a combination of fixed-function and programmable circuitry configured to perform the above example techniques.

In some aspects, system memory 30 may include instructions that cause camera processor 14, CPU 16, GPU 18, and display processor 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display processor 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display processor 26 may retrieve the data from system memory 30 and configure display 28 to display the image represented by the generated image data. For example, display 28 may output the filtered frame generated by camera processor 14. In some examples, display processor 26 may include a digital-to-analog converter (DAC) that is configured to convert the digital values retrieved from system memory 30 into an analog signal consumable by display 28 to drive elements of the displays. In other examples, display processor 26 may pass the digital values directly to display 28 for processing.

Display 28 may include a monitor, a television, a projection device, a liquid crystal display (LCD), a plasma display panel, a light emitting diode (LED) array, or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

Figure 2:
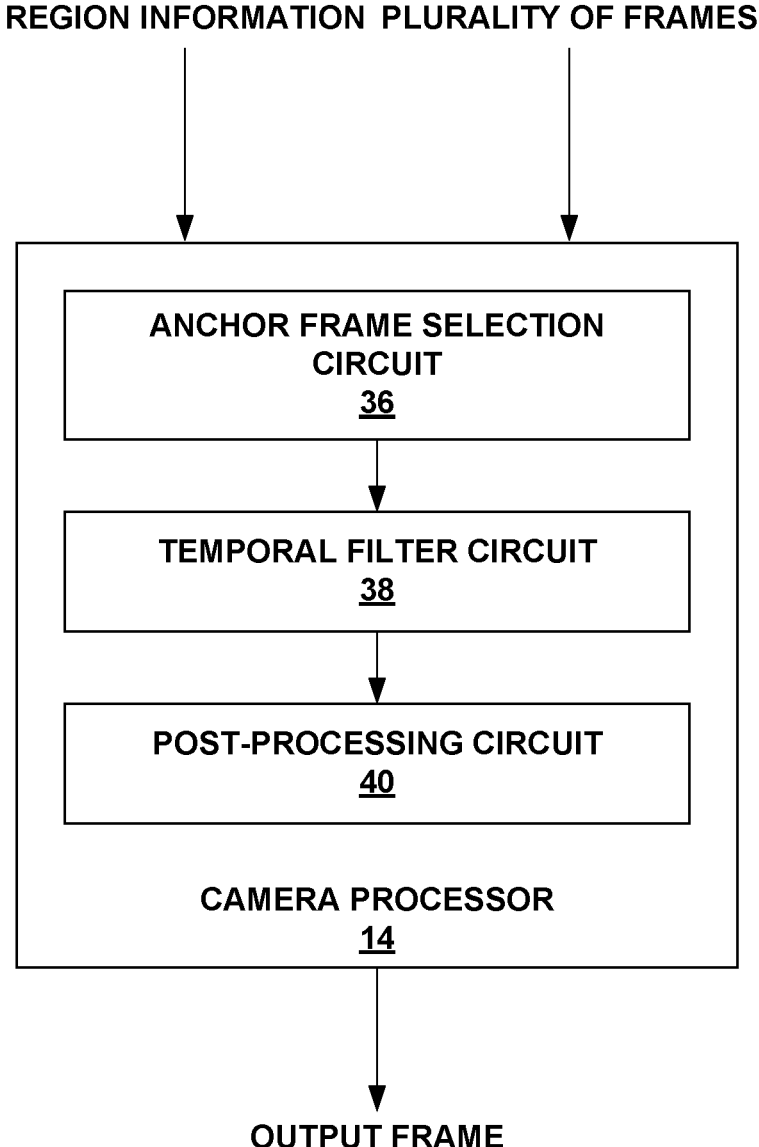
FIG. 2 is a block diagram illustrating a camera processor of the device of FIG. 1 in further detail.

FIG. 2 is a block diagram illustrating a camera processor of the device of FIG. 1 in further detail. As illustrated, camera processor 14 includes anchor frame selection circuit 36, temporal filter circuit 38, and post-processing circuit 40. Anchor frame selection circuit 36, temporal filter circuit 38, and post-processing circuit 40 are illustrated as separate circuits simply to ease with illustration and description. However, anchor frame selection circuit 36, temporal filter circuit 38, and post-processing circuit 40 may be integrated together and need not necessarily be separate circuits within camera processor 14.

As illustrated, camera processor 14 may receive region information and a plurality of frames. The plurality of frames may be the plurality of frames that camera 12 captured, and camera processor 14 may receive the plurality of frames from system memory 30, local memory 20, or directly from camera 12. In some examples, the plurality of frames may be frames that camera 12 captured within a short period of time (e.g., less than 10 seconds, less than 1 second, less than 500 milliseconds, less than 300 milliseconds, less than 100 milliseconds, less than 50 milliseconds, less than 10 milliseconds, less than 5 milliseconds, less than 2 milliseconds, or less than 500 microseconds). The plurality of frames may be frames that capture substantially the same image content since the frames are being captured in a relatively short amount of time. For instance, with a single action to capture an image, camera 12 may capture a series of frames in the short amount of time. For instance, the plurality of frames are captured with camera 12 within less than 300 milliseconds and capture substantially same image content (e.g., more than 90% of the image content is the same).

Region information may include information of a region within which camera processor 14 may determine a region of interest (ROI). As one example, the region information includes information identifying foreground areas (e.g., grids) within the plurality of frames. For example, a multiwindow (MW) autofocus (AF) algorithm, executing on CPU 16, may select the best foreground grids when autofocus (AF) finishes converging. The foreground areas may be one or more objects of interest that the user is more likely to focus on than other objects. The MW AF algorithm may divide an ROI into multi-grids, and converges on the image content that is closest (e.g., based on depth values). The image content that is closest may be foreground areas.

As another example, the region information is user input that a user provides (e.g., based on content being displayed on display 28 or some other form of user selection). For example, prior to taking an image, computing device 10 may be in a preview mode in which display 28 displays image content as a preview of the image that the user will take. During the preview mode, the user may interact with display 28 to provide region information.

As another example, the region information includes at least one face. For example, during the preview mode, computing device 10 may be configured to detect faces (e.g., human faces but animal faces are possible) in the image content. For instance, although not specifically shown, computing device 10, CPU 16, or camera processor 14 may include face detection circuitry that scans the image content in the preview mode and identifies shapes that appear to form faces. The face detection circuitry may determine shapes based on changes in contrast in the image content. The face detection circuitry may determine whether the shapes tend to form shapes of a face. In some examples, the face detection circuitry may be further configured to determine if there are shapes similar to the shapes of eyes, shapes similar to a shape of a nose, and shapes similar to a shape of a mouth in the shapes that the face detection circuitry initially classified as being faces to confirm that detected faces are actually faces. The face detection circuitry may provide information of one or more detected faces to camera processor 14. In some examples, CPU 16 may execute a face detection algorithm configured to detect a face similar to how the face detection circuitry may detect a face.

There may be other examples of region information and the example techniques are not limited to the example region information. In some examples, the default region information may be the foreground information. For example, camera processor 14 may utilize the foreground information as default for performing the example techniques described in this disclosure. However, if there is user input for the region information or there are detected faces in the region information, then camera processor 14 may utilize the user input or detected faces for performing the example techniques described in this disclosure. In some examples, camera processor 14 may utilize any combination of the region information for performing the example techniques described in this disclosure.

Anchor frame selection circuit 36 may be configured to select an anchor frame from the plurality of frames. Anchor frame selection circuit 36 may select any frame (e.g., the first frame) as the anchor frame, or may select a frame from the plurality of frames based on characteristics of the frame (e.g., sharpness values). The example techniques are not limited to any specific technique for selecting an anchor frame.

Temporal filter circuit 38 may be configured to filter (e.g., blend) the anchor frame with at least another frame of the plurality of frames. For example, temporal filter circuit 38 may start with the anchor frame and blend the anchor frame with another frame by temporally filtering the anchor frame with the other frame. Then, temporal filter circuit 38 may blend the resulting frame (e.g., intermediate frame) with another frame, and so forth. The result of the blending may be a filtered frame.

In accordance with one or more examples described in this disclosure, temporal filter circuit 38 may be configured to apply a first amount of filtering on the ROI for one or more frames of the plurality of frames to generate a filtered ROI, and apply a second amount of filtering on remaining region for the one or more frames of the plurality of frames to generate a filtered remaining region. For example, the plurality of frames includes a first frame and a second frame. Temporal filter circuit 38 may apply a first amount of filtering on the ROI of the first frame and the second frame to generate a filtered ROI (e.g., as part of the process of generating the filtered ROI), and apply a second amount of filtering on a remaining region of the first frame and the second frame to generate a filtered remaining region (e.g., as part of the process of generating the filtered remaining region). Temporal filter circuit 38 may then combine the filtered ROI and the filtered remaining region to generate a filtered frame.

For example, rather than applying temporal filtering on the entirety of the frame, temporal filter circuit 38 may apply different amounts of filtering on different regions of the first frame and second frame. Temporal filter circuit 38 may apply less filtering (e.g., weaker filtering) on the ROI of the frames (e.g., first frame and second frame) to avoid over blurring, and apply more filtering (e.g., stronger filtering) on the remaining region of the frames (e.g., first frame and second frame) to increase signal-to-noise ratio.

The amount of filtering that temporal filter circuit 38 applies may be based on the number of frames that are used (e.g., involved or contributed to) the filtering. Stronger filtering utilizes more frames than weaker filtering. Accordingly, temporal filter circuit 38 may filter the ROI using fewer frames than the number of frames used to filter the remaining region.

One example way in which to control the number of frames used for filtering is based on comparison of the frames. For instance, temporal filter circuit 38 may determine a normalized SAD value between the ROI in the anchor frame and the ROI in a second frame, and compare the normalized SAD value to a first threshold. If the normalized SAD value is less than the first threshold, then temporal filter circuit 38 may filter the ROI in the anchor frame and the ROI in the second frame to generate an intermediate filtered ROI, and repeat these operations with a third frame and so on until the last frame of the plurality of frames. If the normalized SAD value is not less than the first threshold, then temporal filter circuit 38 may not filter the ROI in the anchor frame and the ROI in the second frame, and may repeat these operations with a third frame, where the ROI in the anchor frame is considered to be the intermediate filtered ROI and so on until the last frame of the plurality of frames.

In this way, temporal filter circuit 38 may generate a filtered ROI. That is, there is a first group of frames from the plurality of frames that temporal filter circuit 38 uses to generate a filtered ROI.

Similarly, temporal filter circuit 38 may determine a normalized SAD value between the remaining region (e.g., region except ROI) in the anchor frame and the remaining region in a second frame, and compare the normalized SAD value to a second threshold. If the normalized SAD value is less than the second threshold, then temporal filter circuit 38 may filter the remaining region in the anchor frame and the remaining region in the second frame to generate an intermediate filtered remaining region, and repeat these operations with a third frame and so on until the last frame of the plurality of frames. If the normalized SAD value is not less than the second threshold, then temporal filter circuit 38 may not filter the remaining region in the anchor frame and the remaining region in the second frame, and may repeat these operations with a third frame, where the remaining region in the anchor frame is considered to be the intermediate filtered remaining region and so on until the last frame of the plurality of frames.

In this way, temporal filter circuit 38 may generate a filtered remaining region. That is, there is a second group of frames from the plurality of frames that temporal filter circuit 38 uses to generate a filtered remaining region. In some examples, a number of frames in the first group of frames is less than a number of frames in the second group of frames.

Accordingly, in one or more examples, to apply the first amount of filtering, temporal filter circuit 38 may perform filtering of the ROI in the first frame and the second frame with a first number of frames. To apply the second amount of filtering, temporal filter circuit 38 may perform filtering on the remaining region in the first frame and the second frame with a second number of frames. The first number of frames is less than the second number of frames.

In the above example of the temporal filter circuit 38 generating the filtered ROI and the filtered remaining region, the first threshold may be less than the second threshold. Therefore, it is more likely for a frame to be used for generating the filtered remaining region than to generate the filtered ROI. For instance, the number of frames in the first group of frames used to generate the filtered ROI may be less than the number of frames in the second group of frames used to generate the filtered remaining region. That is, the first number of frames used for applying the first amount of filtering on the ROI of the first frame and the second frame is less than the second number of frames used for applying the second amount of filtering on the remaining region of the first frame and the second frame.

In some examples, performing filtering of the ROI in the first frame and the second frame with a first number of frames may mean that the ROI in the first frame is filtered with ROI in the second frame to generate an intermediate filtered ROI, which is then filtered with an ROI of a third frame, and so on. The first number of frames refers to the number of frames used for filtering respective ROIs. For instance, whether an ROI of a frame is used for filtering or not may be based on SAD calculations (as one example), as described above.

Similarly, performing filtering of the remaining region in the first frame and the second frame with a second number of frames may mean that the remaining region in the first frame is filtered with the remaining region in the second frame to generate an intermediate filtered remaining region, which is then filtered with a remaining region of third frame, and so on. The second number of frames refers to the number of frames used for filtering respective remaining regions. For instance, whether a remaining region of a frame is used for filtering or not may be based on SAD calculations (as one example), as described above. The first number of frames used for filtering ROI may be less than the second number of frames used for filtering the remaining region.

Accordingly, temporal filter circuit 38 may be configured to apply different amounts of filtering for different regions of frames, which may result in higher image quality. For instance, there may not be over blurring of the face, but the signal-to-noise ratio of the frame may remain relatively high.

Post-processing circuit 40 may be configured to perform any post-processing, such as additional filtering or any other processing needed to prepare the filtered frame to be output. Post-processing may be optional. Examples of post-processing include spatial filtering (e.g., filtering across image content in the same frame) or edge enhancement, as a few examples. Display 28 may then display the filtered frame.

Figure 3:
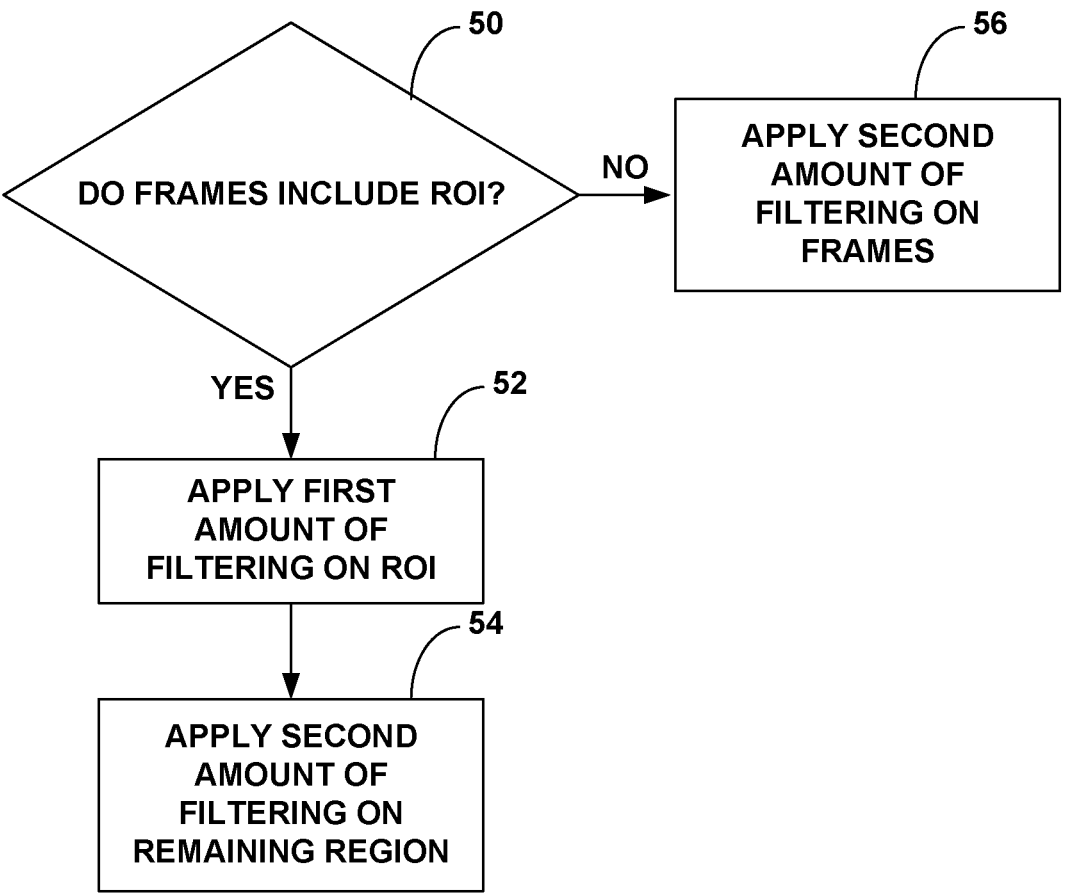
FIG. 3 is a flowchart illustrating an example operation in accordance with example techniques of this disclosure.

FIG. 3 is a flowchart illustrating an example operation in accordance with example techniques of this disclosure. FIG. 3 illustrates an example where there are different sets of frames, where one set of frame may include an ROI and another set of frames may not include an ROI, and the manner in which temporal filter circuit 38 may filter the frames.

For instance, for a first set of frames, CPU 16 (e.g., through face detection) or some other circuitry may determine whether the first set of frames include an ROI (50). For instance, CPU 16 may determine whether the first set of frames includes a face. If there is an ROI in the first set of frames (YES of 50), temporal filter circuit 38 may apply a first amount of filtering on the ROI for one or more frames of the plurality of frames of the first set of frames to generate a filtered ROI (52). Temporal filter circuit 38 may apply a second amount of filtering on remaining region for the one or more frames of the plurality of frames of the first set of frames to generate a filtered remaining region (54). Temporal filter circuit 38 may combine the filtered ROI and the filtered remaining region to generate a first filtered frame.

As another example, for a second set of frames, CPU 16 may determine whether the second set of frames include an ROI (50). For instance, the second set of frames may include a third frame. CPU 16 may determine that there is no ROI in a third frame. If there is no ROI in the second set of frame (e.g., in the third frame) (NO of 50), temporal filter circuit 38 may apply the second amount of filtering on the second set of frames to generate a second filtered frame (56). In other words, CPU 16 may apply the second amount of filtering on the third frame. For instance, the threshold used to determine whether a frame is to be included for filtering frames in the second set of frames may be the same threshold that is used to determine whether a frame is to be included for filtering remaining region in the first set of frames.

Figure 4:
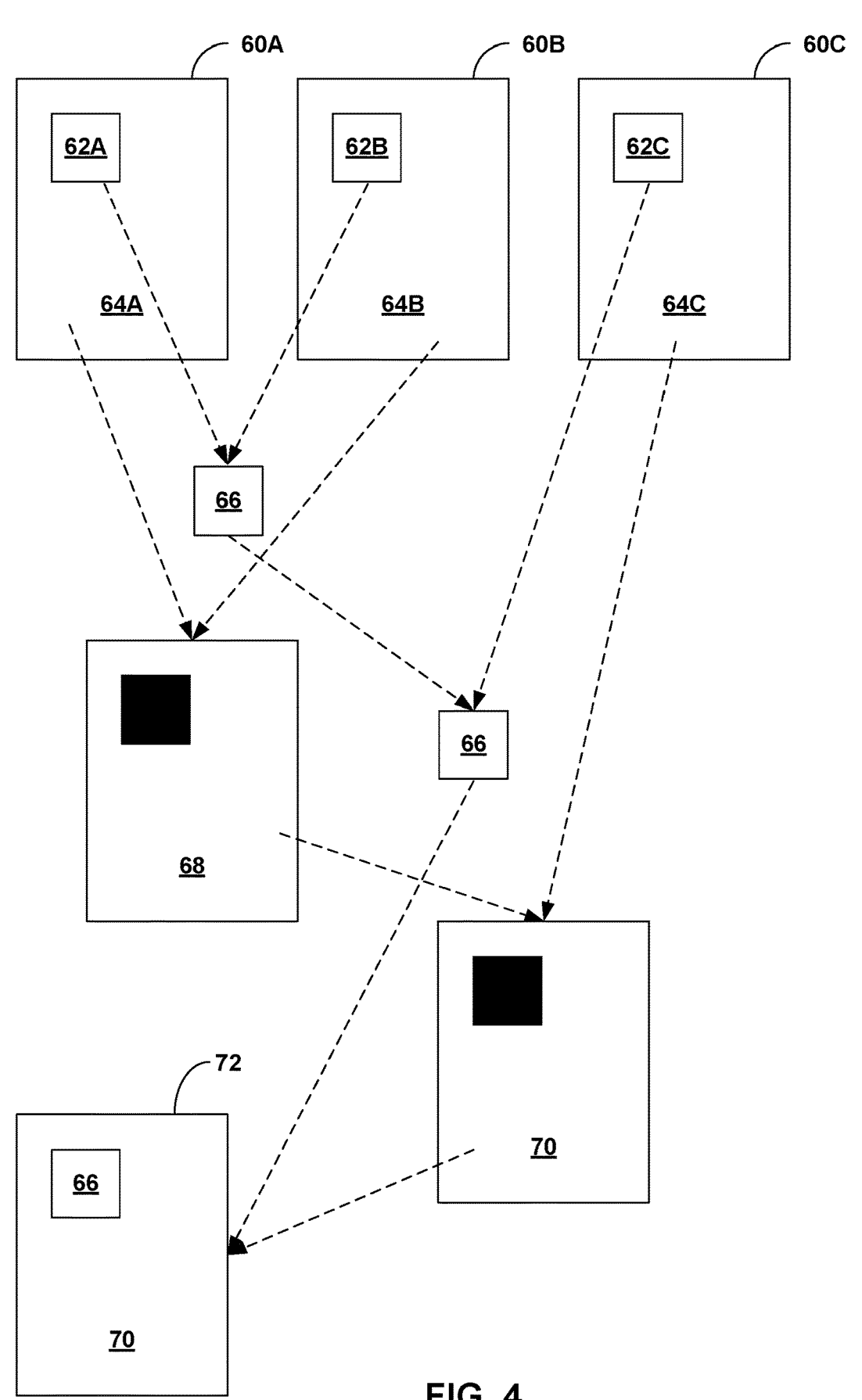
FIG. 4 is a flow diagram illustrating an example operation in accordance with example techniques of this disclosure.

FIG. 4 is a flow diagram illustrating an example operation in accordance with example techniques of this disclosure. For instance, FIG. 4 illustrates frames 60A, 60B, and 60C that were captured together (e.g., with a slight delay) that include similar image content for MFNR.

Frame 60A includes ROI 62A and remaining region 64A, frame 60B includes ROI 62B and remaining region 64B, and frame 60C includes ROI 62C and remaining region 64C. For instance, CPU 16 or some other circuitry may have detected a face in one of frames 60A-60C, determined a region that encompasses the face, and assigned that region as ROI. CPU 16 may have then assigned that same region as an ROI for each of frames 60A-60C.

For example, CPU 16 may detect a face in frame 60A, and encompass the face with a rectangular box. ROI 62A may be an example of the rectangular box. CPU 16 may then determine ROI 62B and ROI 62C in frame 60B and frame 60C, respectively, based on the location of ROI 62A in frame 60A (e.g., ROI 62B and ROI 62C may be in the same location in frame 60B and 60C as ROI 62A in frame 60A). In some examples, CPU 16 may detect ROI 62A, 62B, and 62C in each one of frames 60A, 60B, and 60C. Remaining regions 64A, 64B, and 64C may be regions in frames 60A, 60B, and 60C expect for respective ones of ROIs 62A, 62B, and 62C.

Although one ROI is shown in each of frames 60A, 60B, and 60C, there may be a plurality of ROIs in each one of frames 60A, 60B, and 60C. Also, remaining regions 64A, 64B, and 64C need not necessarily be the entire remaining region except for respective ROIs 62A, 62B, and 62C, and may be less than the entire remaining region.

In the example of FIG. 4, temporal filter circuit 38 may determine a first difference value (e.g., normalized SAD value) between ROI 62A in first frame 60A of the plurality of frames and ROI 62B in second frame 60B of the plurality of frames. Temporal filter circuit 38 may compare the first difference value to a first threshold, and blend ROI 62A in the first frame 60A with ROI 62B in the second frame 60B based on the comparison of the first difference value to the first threshold to generate an intermediate filtered ROI 66. For instance, temporal filter circuit 38 may determine that the first difference value is less than the first threshold, and blend the ROI 62A in the first frame 60A with the ROI 62B in the second frame 60B based on the first difference value being less than the first threshold.

Temporal filter circuit 38 may determine a second difference value (e.g., normalized SAD value) between remaining region 64A in first frame 60A of the plurality of frames and remaining region 64B in second frame 60B of the plurality of frames. Temporal filter circuit 38 may compare the second difference value to a second threshold, and blend remaining region 64A in the first frame 60A with remaining region 64B in the second frame 60B based on the comparison of the second difference value to the second threshold to generate an intermediate filtered remaining region 68. For instance, temporal filter circuit 38 may determine that the second difference value is less than the second threshold, and blend the remaining region 64A in the first frame 60A with the remaining region 64B in the second frame 60B based on the second difference value being less than the second threshold.

Temporal filter circuit 38 may determine a third difference value (e.g., normalized SAD value) between intermediate filtered ROI 66 and ROI 62C in third frame 60C of the plurality of frames. Temporal filter circuit 38 may compare the third difference value to the first threshold. However, in this example, third difference value may be greater than the first threshold. Therefore, temporal filter circuit 38 may not blend intermediate filtered ROI 66 with ROI 62C. Rather, intermediate filtered ROI 66 may be the final filtered ROI.

Temporal filter circuit 38 may determine a fourth difference value (e.g., normalized SAD value) between intermediate filtered remaining region 68 and remaining region 64C in third frame 60C of the plurality of frames. Temporal filter circuit 38 may compare the fourth difference value to the second threshold, and blend intermediate filtered remaining region 68 with remaining region 64C in the third frame 60C based on the comparison of the fourth difference value to the second threshold to generate filtered remaining region 70. For instance, temporal filter circuit 38 may determine that the fourth difference value is less than the second threshold, and blend the intermediate filtered remaining region 68 with the remaining region 64C in the third frame 60C based on the fourth difference value being less than the second threshold.

Temporal filter circuit 38 may combine the filtered ROI 66 and the filtered remaining region 70 to generate a filtered frame 72. Temporal filter circuit 38 or camera processor 14 may then output the filtered frame (e.g., possibly with post-processing with post-processing circuit 40).

FIG. 5 is a flowchart illustrating an example operation in accordance with example techniques of this disclosure. The example techniques are described with respect to one or more processors, examples of which include any combination of camera processor 14, CPU 16, GPU 18, display processor 26, or other processing circuitry.

The one or more processors may determine a region of interest (ROI) within a first frame and second frame of a plurality of frames (80). For example, the one or more processors may be configured to detect a face in the first frame and the second frame. The ROI is a face ROI based on the detected face in the first frame and the second frame. Face ROI is one example, and there may be other examples of ROI in the plurality of frames. Also, there may be more than one ROI in a frame of the plurality of frames.

In accordance with one or more examples described in this disclosure, the one or more processors may apply a first amount of filtering on the ROI of the first frame and second frame to generate a filtered ROI (82). Applying the first amount of filtering on the ROI of the first frame and the second frame may not immediately result in the filtered ROI (although possible if there are only two frames). Rather, applying the first amount of filtering on the ROI of the first frame and second frame to generate the filtered ROI may refer to applying the first amount of filtering on the ROI of the first frame and second frame as part of the process of generating the filtered ROI (e.g., such as generating intermediate filtered ROIs).

The one or more processors may apply a second amount of filtering on a remaining region for the first frame and the second frame to generate a filtered remaining region (84). Applying the second amount of filtering on the ROI of the first frame and the second frame may not immediately result in the filtered remaining region (although possible if there are only two frames). Rather, applying the second amount of filtering on the remaining region of the first frame and second frame to generate the filtered remaining region may refer to applying the first amount of filtering on the remaining region of the first frame and second frame as part of the process of generating the filtered remaining region (e.g., such as generating intermediate filtered remaining regions).

For example, applying the first amount of filtering may include performing filtering of the ROI in a first group of frames of the plurality of frames, and applying the second amount of filtering may include performing filtering of the remaining region in a second group of frames of the plurality of frames. A number of frames in the first group of frames may be less than a number of frames in the second group of frames.

Stated another way, applying the first amount of filtering may include performing filtering of the ROI in the first frame and the second frame with a first number of frames, and applying the second amount of filtering may include performing filtering of the remaining region in the first frame and the second frame with a second number of frames. The first number of frames is less than the second number of frames.

For instance, applying the first amount of filtering on the ROI may include determining whether an ROI in a frame of the plurality of frames is to be included in the filtering based on a first threshold, and applying the second amount of filtering on the remaining region may include determining whether a remaining region in the frame of the plurality of frames is to be included in the filtering based on a second threshold. The first threshold and the second threshold may be different. For instance, the first threshold may be less than the second threshold.

As an example, applying the first amount of filtering on the ROI may include determining whether an ROI in the first frame and the second frame is to be included in the filtering based on a first threshold, and applying the second amount of filtering on the remaining region may include determining whether a remaining region in the first frame and the second frame is to be included in the filtering based on a second threshold. The first threshold and the second threshold are different (e.g., first threshold is less than second threshold).

As an example, applying the first amount of filtering on the ROI may include determining a first difference value between the ROI in a first frame of the plurality of frames and the ROI in a second frame of the plurality of frames, comparing the first difference value to a first threshold, and blending the ROI in the first frame with the ROI in the second frame based on the comparison of the first difference value to the first threshold to generate an intermediate filtered ROI prior to generating the filtered ROI. For instance, to blend the ROI in the first frame with the ROI in the second frame based on the comparison of the first difference value to the first threshold, the one or more processors may determine that the first difference value is less than the first threshold, and blend the ROI in the first frame with the ROI in the second frame based on the first difference value being less than the first threshold.

Applying the second amount of filtering on the remaining region may include determining a second difference value between the remaining region in the first frame of the plurality of frames and the remaining region in the second frame of the plurality of frames, comparing the second difference value to a second threshold, wherein the second threshold is different than the first threshold, and blending the remaining region in the first frame with the remaining region in the second frame based on the comparison of the second difference value to the second threshold to generate an intermediate filtered remaining region prior to generating the filtered remaining region. For instance, to blend the remaining region in the first frame with the remaining region in the second frame based on the comparison of the second difference value to the second threshold, the one or more processors may be configured to determine that the second difference value is less than the second threshold, and blend the remaining region in the first frame with the remaining region in the second frame based on the second difference value being less than the second threshold.

In one or more examples, the one or more processors may determine a third difference value between the intermediate filtered ROI and the ROI in a third frame of the plurality of frames, compare the third difference value to the first threshold, and blend the intermediate filtered ROI with the ROI in the third frame based on the comparison of the third difference value to the first threshold. Also, the one or more processors may determine a fourth difference value between the intermediate filtered remaining region and the remaining region in the third frame of the plurality of frames, compare the fourth difference value to the second threshold, and blend the intermediate filtered remaining region with the remaining region in the third frame based on the comparison of the fourth difference value to the second threshold. In this way, by repeating such operations, the one or more processors may generate the filtered ROI and the filtered remaining region.

The one or more processors may combine the filtered ROI and the filtered remaining region to generate a filtered frame (86). The one or more processors may output the filtered frame (88).

The following describe one or more example techniques described in this disclosure. The example techniques may be used together or separately.

Clause 1: A device for image processing includes a memory; and one or more processors coupled to the memory and configured to: determine a region of interest (ROI) within a first frame and a second frame of a plurality of frames; apply a first amount of filtering on the ROI of the first frame and the second frame to generate a filtered ROI; apply a second amount of filtering on a remaining region of the first frame and the second frame to generate a filtered remaining region; combine the filtered ROI and the filtered remaining region to generate a filtered frame; and output the filtered frame.

Clause 2: The device of clause 1, wherein the one or more processors are configured to detect a face in the first frame and the second frame, wherein the ROI is a face ROI based on the detected face in the first frame and second frame.

Clause 3: The device of any of clauses 1 and 2, wherein the one or more processors are configured to: determine that there is no ROI in a third frame; and apply the second amount of filtering on the third frame.

Clause 4: The device of any of clauses 1 through 3, wherein applying the first amount of filtering comprises performing filtering of the ROI in the first frame and the second frame with a first number of frames, wherein applying the second amount of filtering comprises performing filtering of the remaining region in the first frame and the second frame with a second number of frames, and wherein the first number of frames is less than the second number of frames.

Clause 5: The device of any of clauses 1 through 3, wherein applying the first amount of filtering on the ROI comprises determining whether an ROI in the first frame and the second frame is to be included in the filtering based on a first threshold, wherein applying the second amount of filtering on the remaining region comprises determining whether a remaining region in the first frame and the second frame is to be included in the filtering based on a second threshold, and wherein the first threshold and the second threshold are different.

Clause 6: The device of any of clauses 1 through 5, wherein applying the first amount of filtering on the ROI comprises: determining a first difference value between the ROI in the first frame and the ROI in the second frame; comparing the first difference value to a first threshold; and blending the ROI in the first frame with the ROI in the second frame based on the comparison of the first difference value to the first threshold to generate an intermediate filtered ROI prior to generating the filtered ROI, and wherein applying the second amount of filtering on the remaining region comprises: determining a second difference value between the remaining region in the first frame and the remaining region in the second frame; comparing the second difference value to a second threshold, wherein the second threshold is different than the first threshold; and blending the remaining region in the first frame with the remaining region in the second frame based on the comparison of the second difference value to the second threshold to generate an intermediate filtered remaining region prior to generating the filtered remaining region.

Clause 7: The device of clause 6, wherein applying the first amount of filtering on the ROI comprises: determining a third difference value between the intermediate filtered ROI and the ROI in a third frame; comparing the third difference value to the first threshold; and blending the intermediate filtered ROI with the ROI in the third frame based on the comparison of the third difference value to the first threshold to generate the filtered ROI, and wherein applying the second amount of filtering on the remaining region comprises: determining a fourth difference value between the intermediate filtered remaining region and the remaining region in the third frame; comparing the fourth difference value to the second threshold; and blending the intermediate filtered remaining region with the remaining region in the third frame based on the comparison of the fourth difference value to the second threshold to generate the filtered remaining region.

Clause 8: The device of any of clause 6, wherein blending the ROI in the first frame with the ROI in the second frame based on the comparison of the first difference value to the first threshold comprises: determining that the first difference value is less than the first threshold; and blending the ROI in the first frame with the ROI in the second frame based on the first difference value being less than the first threshold, wherein blending the remaining region in the first frame with the remaining region in the second frame based on the comparison of the second difference value to the second threshold comprises: determining that the second difference value is less than the second threshold; and blending the remaining region in the first frame with the remaining region in the second frame based on the second difference value being less than the second threshold, and wherein the first threshold is less than the second threshold.

Clause 9: The device of any of clauses 1 through 8, wherein the plurality of frames are captured with a camera within less than 300 milliseconds and capture substantially same image content.

Clause 10: The device of any of clauses 1 through 9, wherein the device comprises a mobile device that includes one or more cameras to capture the plurality of frames.

Clause 11: A method for image processing includes determining a region of interest (ROI) within a first frame and a second frame of a plurality of frames; applying a first amount of filtering on the ROI of the first frame and the second frame to generate a filtered ROI; applying a second amount of filtering on a remaining region of the first frame and the second frame to generate a filtered remaining region; combining the filtered ROI and the filtered remaining region to generate a filtered frame; and outputting the filtered frame.

Clause 12: The method of clause 11, further comprising detecting a face in the first frame and the second frame, wherein the ROI is a face ROI based on the detected face in the first frame and the second frame.

Clause 13: The method of any of clauses 11 and 12, further includes determining that there is no ROI in a third frame; and applying the second amount of filtering on the third frame.

Clause 14: The method of any of clauses 11 through 13, wherein applying the first amount of filtering comprises performing filtering of the ROI in the first frame and the second frame with a first number of frames, wherein applying the second amount of filtering comprises performing filtering of the remaining region in the first frame and the second frame with a second number of frames, and wherein the first number of frames is less than the second number of frames.

Clause 15: The method of any of clauses 11 through 13, wherein applying the first amount of filtering on the ROI comprises determining whether an ROI in the first frame and the second frame is to be included in the filtering based on a first threshold, wherein applying the second amount of filtering on the remaining region comprises determining whether a remaining region in the first frame and the second frame is to be included in the filtering based on a second threshold, and wherein the first threshold and the second threshold are different.

Clause 16: The method of any of clauses 11 through 15, wherein applying the first amount of filtering on the ROI comprises: determining a first difference value between the ROI in the first frame and the ROI in the second frame; comparing the first difference value to a first threshold; and blending the ROI in the first frame with the ROI in the second frame based on the comparison of the first difference value to the first threshold to generate an intermediate filtered ROI prior to generating the filtered ROI, and wherein applying the second amount of filtering on the remaining region comprises: determining a second difference value between the remaining region in the first frame and the remaining region in the second frame; comparing the second difference value to a second threshold, wherein the second threshold is different than the first threshold; and blending the remaining region in the first frame with the remaining region in the second frame based on the comparison of the second difference value to the second threshold to generate an intermediate filtered remaining region prior to generating the filtered remaining region.

Clause 17: The method of clause 16, wherein applying the first amount of filtering on the ROI comprises: determining a third difference value between the intermediate filtered ROI and the ROI in a third frame; comparing the third difference value to the first threshold; and blending the intermediate filtered ROI with the ROI in the third frame based on the comparison of the third difference value to the first threshold to generate the filtered ROI, and wherein applying the second amount of filtering on the remaining region comprises: determining a fourth difference value between the intermediate filtered remaining region and the remaining region in the third frame; comparing the fourth difference value to the second threshold; and blending the intermediate filtered remaining region with the remaining region in the third frame based on the comparison of the fourth difference value to the second threshold to generate the filtered remaining region.

Clause 18: The method of any of clause 16, wherein blending the ROI in the first frame with the ROI in the second frame based on the comparison of the first difference value to the first threshold comprises: determining that the first difference value is less than the first threshold; and blending the ROI in the first frame with the ROI in the second frame based on the first difference value being less than the first threshold, wherein blending the remaining region in the first frame with the remaining region in the second frame based on the comparison of the second difference value to the second threshold comprises: determining that the second difference value is less than the second threshold; and blending the remaining region in the first frame with the remaining region in the second frame based on the second difference value being less than the second threshold, and wherein the first threshold is less than the second threshold.

Clause 19: The method of any of clauses 11 through 18, further comprising capturing the plurality of frames with a camera within less than 300 milliseconds that capture substantially same image content.

Clause 20: A computer-readable storage medium storing instructions thereon that when executed cause one or more processors to: determine a region of interest (ROI) within a first frame and a second frame of a plurality of frames; apply a first amount of filtering on the ROI of the first frame and the second frame to generate a filtered ROI; apply a second amount of filtering on a remaining region of the first frame and the second frame to generate a filtered remaining region; combine the filtered ROI and the filtered remaining region to generate a filtered frame; and output the filtered frame.

Clause 21: The computer-readable storage medium of clause 20, wherein the instructions further comprise instructions that cause the one or more processors to: determine that there is no ROI in a third frame; and apply the second amount of filtering on the third frame.

Clause 22: The computer-readable storage medium of any of clauses 20 and 21, wherein the instructions that cause the one or more processors to apply the first amount of filtering on the ROI comprise instructions that cause the one or more processors to determine whether an ROI in the first frame and the second frame is to be included in the filtering based on a first threshold, wherein the instructions that cause the one or more processors to apply the second amount of filtering on the remaining region comprise instructions that cause the one or more processors to determine whether a remaining region in the first frame and the second frame is to be included in the filtering based on a second threshold, and wherein the first threshold and the second threshold are different.

Clause 23: A device for image processing includes means for determining a region of interest (ROI) within a first frame and a second frame of a plurality of frames; means for applying a first amount of filtering on the ROI of the first frame and the second frame to generate a filtered ROI; means for applying a second amount of filtering on a remaining region of the first frame and the second frame to generate a filtered remaining region; means for combining the filtered ROI and the filtered remaining region to generate a filtered frame; and means for outputting the filtered frame.

Clause 24: The device of clause 23, further comprising means for detecting a face in the first frame and the second frame, wherein the ROI is a face ROI based on the detected face in the first frame and the second frame.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A device for image processing, the device comprising:
a memory; and
one or more processors coupled to the memory and configured to:
determine respective region of interests (ROIs) and respective remaining regions within a plurality of frames including a first frame and a second frame;
apply a first amount of filtering on the ROIs to generate a filtered ROI, wherein to apply the first amount of filtering, the one or more processors are configured to determine a first group of frames from the plurality of frames to be included in filtering the ROIs based at least on a difference between an ROI in the first frame and an ROI in the second frame;
apply a second amount of filtering on the remaining regions to generate a filtered remaining region, wherein to apply the second amount of filtering, the one or more processors are configured to determine a second group of frames from the plurality of frames to be included in filtering the remaining regions based at least on a difference between a remaining region in the first frame and a remaining region in the second frame;

combine the filtered ROI and the filtered remaining region to generate a filtered frame; and output the filtered frame.

2. The device of claim 1, wherein the one or more processors are configured to detect a face in the first frame and the second frame, wherein the ROI in the first frame and the ROI in the second frame is a face ROI based on the detected face in the first frame and second frame.

3. The device of claim 1, wherein the one or more processors are configured to:

determine that there is no ROI in a third frame; and apply the second amount of filtering on the third frame.

4. The device of claim 1, wherein the first group of frames includes a first number of frames, wherein the second group of frames includes a second number of frames, and wherein the first number of frames is less than the second number of frames.

5. The device of claim 1, wherein to determine the first group of frames, the one or more processors are configured to determine the first group of frames based at least on a comparison of the difference between the ROI in the first frame and the ROI in the second frame to a first threshold, wherein to determine the second group of frames, the one or more processors are configured to determine the second group of frames based at least on a comparison of the difference between the remaining region in the first frame and the remaining region in the second frame to a second threshold, and wherein the first threshold and the second threshold are different.

6. The device of claim 1, wherein to apply the first amount of filtering on the ROIs, the one or more processors are configured to:

determine a first difference value between the ROI in the first frame and the ROI in the second frame;

compare the first difference value to a first threshold; and blend the ROI in the first frame with the ROI in the second frame based on the comparison of the first difference value to the first threshold to generate an intermediate filtered ROI prior to generating the filtered ROI, and wherein to apply the second amount of filtering on the remaining regions, the one or more processors are configured to:

determine a second difference value between the remaining region in the first frame and the remaining region in the second frame;

compare the second difference value to a second threshold, wherein the second threshold is different than the first threshold; and blend the remaining region in the first frame with the remaining region in the second frame based on the comparison of the second difference value to the second threshold to generate an intermediate filtered remaining region prior to generating the filtered remaining region.

7. The device of claim 6, wherein to apply the first amount of filtering on the ROIs, the one or more processors are configured to:

determine a third difference value between the intermediate filtered ROI and the ROI in a third frame;

compare the third difference value to the first threshold; and

26 blend the intermediate filtered ROI with the ROI in the third frame based on the comparison of the third difference value to the first threshold to generate the filtered ROI, and wherein to apply the second amount of filtering on the remaining regions, the one or more processors are configured to:

determine a fourth difference value between the intermediate filtered remaining region and the remaining region in the third frame;

compare the fourth difference value to the second threshold; and blend the intermediate filtered remaining region with the remaining region in the third frame based on the comparison of the fourth difference value to the second threshold to generate the filtered remaining region.

8. The device of claim 6, wherein to blend the ROI in the first frame with the ROI in the second frame based on the comparison of the first difference value to the first threshold, the one or more processors are configured to:

determine that the first difference value is less than the first threshold; and blend the ROI in the first frame with the ROI in the second frame based on the first difference value being less than the first threshold, wherein to blend the remaining region in the first frame with the remaining region in the second frame based on the comparison of the second difference value to the second threshold, the one or more processors are configured to:

determine that the second difference value is less than the second threshold; and blend the remaining region in the first frame with the remaining region in the second frame based on the second difference value being less than the second threshold, and wherein the first threshold is less than the second threshold.

9. The device of claim 1, wherein the plurality of frames are captured with a camera within less than 300 milliseconds and capture substantially same image content.

10. The device of claim 1, wherein the device comprises a mobile device that includes one or more cameras to capture the plurality of frames.

11. A method for image processing, the method comprising:

determining respective region of interests (ROIs) and respective remaining regions within a plurality of frames including a first frame and a second frame;

applying a first amount of filtering on the ROIs to generate a filtered ROI, wherein applying the first amount of filtering comprises determining a first group of frames from the plurality of frames to be included in filtering the ROIs based at least on a difference between an ROI in the first frame and an ROI in the second frame;

applying a second amount of filtering on the remaining regions to generate a filtered remaining region, wherein applying the second amount of filtering comprises determining a second group of frames from the plurality of frames to be included in filtering the remaining regions based at least on a difference between a remaining region in the first frame and a remaining region in the second frame;

combining the filtered ROI and the filtered remaining region to generate a filtered frame; and outputting the filtered frame.

12. The method of claim 11, further comprising detecting a face in the first frame and the second frame, wherein the ROI in the first frame and the ROI in the second frame is a face ROI based on the detected face in the first frame and the second frame.

13. The method of claim 11, further comprising:
determining that there is no ROI in a third frame; and
applying the second amount of filtering on the third frame.

14. The method of claim 11, wherein the first group of frames includes a first number of frames, wherein the second group of frames includes a second number of frames, and wherein the first number of frames is less than the second number of frames.

15. The method of claim 11, wherein determining the first group of frames comprises determining the first group of frames based at least on a comparison of the difference between the ROI in the first frame and the ROI in the second frame to a first threshold, wherein determining the second group of frames comprises determining the second group of frames based at least on a comparison of the difference between the remaining region in the first frame and the remaining region in the second frame to a second threshold, and wherein the first threshold and the second threshold are different.

16. The method of claim 11,
wherein applying the first amount of filtering on the ROIs comprises:
determining a first difference value between the ROI in the first frame and the ROI in the second frame;
comparing the first difference value to a first threshold; and
blending the ROI in the first frame with the ROI in the second frame based on the comparison of the first difference value to the first threshold to generate an intermediate filtered ROI prior to generating the filtered ROI, and
wherein applying the second amount of filtering on the remaining regions comprises:
determining a second difference value between the remaining region in the first frame and the remaining region in the second frame;
comparing the second difference value to a second threshold, wherein the second threshold is different than the first threshold; and
blending the remaining region in the first frame with the remaining region in the second frame based on the comparison of the second difference value to the second threshold to generate an intermediate filtered remaining region prior to generating the filtered remaining region.

17. The method of claim 16,
wherein applying the first amount of filtering on the ROIs comprises:
determining a third difference value between the intermediate filtered ROI and the ROI in a third frame;
comparing the third difference value to the first threshold; and
blending the intermediate filtered ROI with the ROI in the third frame based on the comparison of the third difference value to the first threshold to generate the filtered ROI, and
wherein applying the second amount of filtering on the remaining regions comprises:
determining a fourth difference value between the intermediate filtered remaining region and the remaining region in the third frame;

comparing the fourth difference value to the second threshold; and
blending the intermediate filtered remaining region with the remaining region in the third frame based on the comparison of the fourth difference value to the second threshold to generate the filtered remaining region.

18. The method of claim 16,
wherein blending the ROI in the first frame with the ROI in the second frame based on the comparison of the first difference value to the first threshold comprises:
determining that the first difference value is less than the first threshold; and
blending the ROI in the first frame with the ROI in the second frame based on the first difference value being less than the first threshold,
wherein blending the remaining region in the first frame with the remaining region in the second frame based on the comparison of the second difference value to the second threshold comprises:
determining that the second difference value is less than the second threshold; and
blending the remaining region in the first frame with the remaining region in the second frame based on the second difference value being less than the second threshold, and
wherein the first threshold is less than the second threshold.

19. The method of claim 11, further comprising capturing the plurality of frames with a camera within less than 300 milliseconds that capture substantially same image content.

20. A computer-readable storage medium storing instructions thereon that when executed cause one or more processors to:
determine respective region of interests (ROIs) and respective remaining region within a plurality of frames including a first frame and a second frame;
apply a first amount of filtering on the ROIs to generate a filtered ROI, wherein the instructions that cause the one or more processors to apply the first amount of filtering comprise instructions that cause the one or more processors to determine a first group of frame from the plurality of frames to be included in filtering the ROIs based at least on a difference between an ROI in the first frame and an ROI in the second frame;
apply a second amount of filtering on the remaining regions to generate a filtered remaining region, wherein the instructions that cause the one or more processors to apply the second amount of filtering comprise instructions that cause the one or more processors to determine a second group of frames from the plurality of frames to be included in filtering the remaining regions based at least on a difference between a remaining region in the first frame and a remaining region in the second frame;
combine the filtered ROI and the filtered remaining region to generate a filtered frame; and
output the filtered frame.

21. The computer-readable storage medium of claim 20, wherein the instructions further comprise instructions that cause the one or more processors to:
determine that there is no ROI in a third frame; and
apply the second amount of filtering on the third frame.

22. The computer-readable storage medium of claim 20, wherein the instructions that cause the one or more processors to determine the first group of frames comprise instructions that cause the one or more processors to determine the first group of frames based at least on a comparison of the difference between the ROI in the first frame and the ROI in the second frame to a first threshold, wherein the instructions that cause the one or more processors to determine the second group of frame comprise instructions that cause the one or more processors to determine the second group of frames based at least on a comparison of the difference between the remaining region in the first frame and the remaining region in the second frame to a second threshold, and wherein the first threshold and the second threshold are different.

23. A device for image processing, the device comprising:
means for determining respective region of interests (ROIs) and respective remaining portions within a plurality of frames including a first frame and a second frame;
means for applying a first amount of filtering on the ROIs to generate a filtered ROI, wherein the means for applying the first amount of filtering comprises means for determining a first group of frames from the plurality of frames to be included in filtering the ROIs based at least on a difference between an ROI in the first frame and an ROI in the second frame;
means for applying a second amount of filtering on the remaining regions to generate a filtered remaining region, wherein the means for applying the second amount of filtering comprises means for determining a second group of frames from the plurality of frames to be included in filtering the remaining regions based at least on a difference between a remaining region in the first frame and a remaining region in the second frame;
means for combining the filtered ROI and the filtered remaining region to generate a filtered frame; and
means for outputting the filtered frame.

24. The device of claim 23, further comprising means for detecting a face in the first frame and the second frame, wherein the ROI in the first frame and the ROI in the second frame is a face ROI based on the detected face in the first frame and the second frame.

\* \* \* \* \*